(12) United States Patent
Watanabe et al.

(10) Patent No.: US 7,585,101 B2
(45) Date of Patent: Sep. 8, 2009

(54) EXTRUDER AND CYLINDER EXCHANGING METHOD THEREOF

(75) Inventors: Hirofumi Watanabe, Hiroshima (JP); Kazuhiro Kodate, Hiroshima (JP)

(73) Assignee: The Japan Steel Works, Ltd., Tokyo (JP)

( * ) Notice: Subject to any disclaimer, the term of this patent is extended or adjusted under 35 U.S.C. 154(b) by 355 days.

(21) Appl. No.: 11/519,869

(22) Filed: Sep. 13, 2006

(65) Prior Publication Data

US 2007/0058485 A1 Mar. 15, 2007

(30) Foreign Application Priority Data

Sep. 13, 2005 (JP) .......................... P2005-265137

(51) Int. Cl.
*B29C 47/66* (2006.01)
(52) U.S. Cl. ..................................... 366/69; 425/192 R
(58) Field of Classification Search ................ 366/69, 366/79–90, 147, 149; 425/192 R, 200–209
See application file for complete search history.

(56) References Cited

U.S. PATENT DOCUMENTS

| | | | |
|---|---|---|---|
| 3,696,736 A * | 10/1972 | Studli .......................... 100/146 |
| 4,028,027 A * | 6/1977 | Worz ........................ 418/201.1 |
| 4,289,410 A * | 9/1981 | Anders ......................... 366/88 |
| 4,385,876 A * | 5/1983 | Scherping et al. ......... 418/201.1 |
| 4,640,672 A * | 2/1987 | Ellwood .................. 425/192 R |
| 4,913,863 A | 4/1990 | Burrafato et al. |
| 4,941,748 A * | 7/1990 | Pusch et al. .................... 366/85 |
| 5,667,299 A * | 9/1997 | Mizoguchi et al. .......... 366/145 |
| 6,015,226 A * | 1/2000 | Weller et al. ................... 366/79 |
| 7,052,260 B1 * | 5/2006 | Hughes .................... 425/131.1 |
| 7,473,087 B2 * | 1/2009 | Steiner ................... 425/192 R |
| 2007/0058485 A1 * | 3/2007 | Watanabe et al. ........... 366/197 |

FOREIGN PATENT DOCUMENTS

| | | | |
|---|---|---|---|
| DE | 92 00 047 U1 | | 6/1992 |
| JP | 6-297540 A | | 10/1994 |
| JP | 06297540 A | * | 10/1994 |
| JP | 06297541 A | * | 10/1994 |
| JP | 7-266405 A | | 10/1995 |
| JP | 2000225640 A | * | 8/2000 |
| JP | 20070706096 A | * | 3/2007 |

* cited by examiner

*Primary Examiner*—Charles E Cooley
(74) *Attorney, Agent, or Firm*—Sughrue Mion, PLLC

(57) ABSTRACT

In an extruder of the invention, a screw receiving portion penetrates through a cylinder from one connection surface to the other connection surface thereof and the connection surface of the cylinder is connected to the connection surface of other cylinder, a key groove for positioning the other cylinder and a recess having a taper surface are formed in at least one of outer wall surface of the cylinder except the connection surface thereof, and a wedge portion of a connection member is pressed into the recess to connect adjacent cylinders.

14 Claims, 6 Drawing Sheets

8A - 8A

9A - 9A

10A - 10A

EXTRUDER AND CYLINDER EXCHANGING METHOD THEREOF

This application is based on Japanese Patent Application No. 2005-265137, which is incorporated herein by reference.

BACKGROUND OF THE INVENTION

1. Field of the Invention

The present invention relates to an extruder and a cylinder exchanging method thereof.

2. Description of the Related Art

In a small-sized extruder used for various experiments, cylinders are frequently disassembled and reassembled. Accordingly, the extruder must have a structure which is capable of easily disassembling and reassembling the cylinders. As a method of assembling the cylinders, there is a provided a method of providing flanges on the both ends of the cylinders and fastening the flanges using a plurality of bolts. However, this method is not suitable for the small-sized extruder for experiment. When the flanges are fastened using the bolts, the plurality of bolts must be exchanged. Accordingly, this method is not suitable for the extruder for experiment in which exchange is frequently performed. In addition, when the flange is provided, the size required for attaching a heating source (heater), a devotalilization device (vent) or a feeding device (side feed) cannot be ensured.

Accordingly, the small-sized cylinders are generally fastened using a tie bar bolt fastening method of fastening all the cylinders without using the flanges.

FIG. 8 to 10 are front views and side views showing an intermediate cylinder, a vent cylinder and a side feed cylinder of a related small-sized twin-screw extruder in which a flange is not provided, respectively, each of which A is the front view and B is the cross-sectional side view.

In an intermediate cylinder 110 shown in FIG. 8, a screw receiving portion 100 having a cross-sectional shape in which two circular arcs communicate with each other and a drill jacket 101 surrounding the screw receiving portion are provided. Positioning pin holes 102 and tie bar bolt holes 103 are formed in the outside of the drill jacket 101. In a vent cylinder 111 shown in FIG. 9, vent holes 113 are formed in addition to the above-described configuration. In a side feed cylinder 112 shown in FIG. 10, side feedholes 114 are formed. These cylinders are held together by a bolt 104, passing through the tie bar bolt hole 103. In addition, an unillustrated heater is attached to each of the cylinders.

However, in the extruder having the configurations shown in FIGS. 8 to 10, the cylinder needs to be moved in the axial direction of the positioning pin 105 until the positioning pin 105 is pulled out of a corresponding positioning pin hole 102 when the cylinder is exchanged as shown in FIGS. 11A-11B. For the movement in the axial direction of the positioning pin 105, a space for pulling out the exchanged cylinder need be ensured by moving the other cylinders as well as the exchanged cylinder in the axial direction.

JP-A-07-266405 discloses an extruder capable of exchanging a cylinder without moving the cylinder in an axial direction of a pin. In the cylinder of this extruder, two grooves are formed in a lower surface and tie rods are inserted into the two grooves to position the cylinder. By this configuration, the cylinder can be pulled upward and exchanged.

In the extruder having the configuration disclosed in JP-A-07-266405, seven segment barrels including segment barrels 4(A) to 4(G) are connected. In each of the segment barrels, two through-holes, through which tie rods 10 penetrates as well as cutout grooves 13 are formed. The tie rods 10 are not only fitted into the cutout grooves 13 but also inserted into the through-holes from the segment barrel 4(G) side. Accordingly, when the segment barrels 4(B) to 4(G) except the segment barrel 4(A) are exchanged, the tie rods inserted into the through-holes of the segment barrels which are not directly associated with the exchange must be also pulled out. Thus, after the segment barrel is exchanged, it is necessary to position the other segment barrels which are not directly associated with the exchange and to insert the tie rods 10 into the other segment barrels.

SUMMARY OF THE INVENTION

Accordingly, it is an object of the present invention to provide an extruder capable of exchanging a cylinder without positioning cylinders which are not directly associated with exchange and a cylinder exchanging method thereof.

In order to accomplish the above-described object, according to the present invention, there is provided an extruder comprising a cylinder, through which a screw receiving portion penetrates from one connection surface of the cylinder to other connection surface thereof, the connection surface of the cylinder being connected to a connection surface of other cylinder, wherein at least one outer wall surface, except the connection surface, of the cylinder comprises a key groove for positioning the other cylinder, and a recess having a taper surface, and wherein the extruder further comprises a connection member including a wedge portion which is pressed into the recess to connect the cylinder with the other cylinder.

In the extruder according to the present invention configured above, the positioning pin for positioning is formed in the outer wall surface, in which the positioning key grooves are formed, instead of in the connection surface. While the cylinder must move to a position for pulling out the positioning pin in the related art, the cylinder need not move to the position for pulling out the positioning pin in the present invention. In the extruder according to the present invention, the cylinders are connected by inserting the wedge portions of the connection member into the recesses formed in the outer wall surface of the cylinder similar to the key grooves, instead of passing the tie rods through the holes to connect the cylinders. By this configuration, a desired cylinder can be exchanged by detaching the connection member and thus the other cylinders need not be positioned and connected.

The connection member may further comprise two wedge portions formed in one surface of the connection member, and a through-hole through which a pin or an entirely threaded bolt being erected on the at least one outer wall surface of the cylinder penetrates.

Alternatively, in the extruder according to the present invention, a threaded hole is formed in the at least one outer wall surface of the cylinder, and wherein the connection member further comprises two wedge portions formed in one surface of the connection member, and a through-hole through which a bolt for fastening into a threaded hole formed in the at least one outer wall surface of the cylinder penetrates.

According to the present invention, there is provided a method of exchanging a cylinder of an extruder, the extruder comprising a cylinder, through which a screw receiving portion penetrates from one connection surface of the cylinder to other connection surface thereof, the connection surface of the cylinder being connected to a connection surface of other cylinder, wherein at least one outer wall surface, except the connection surface, of the cylinder comprises a key groove for positioning the other cylinder and a recess having a taper surface, the method comprising inserting a key into the key groove, and inserting and extracting two wedge portions of a connection member into and from the recess of the other cylinder, the two wedge portions being formed in one surface of the connection member.

According to the present invention, only a desired cylinder can be exchanged and the other cylinders need not be positioned or connected.

DETAILED DESCRIPTION OF THE PREFERRED EMBODIMENTS

Figure 1B:
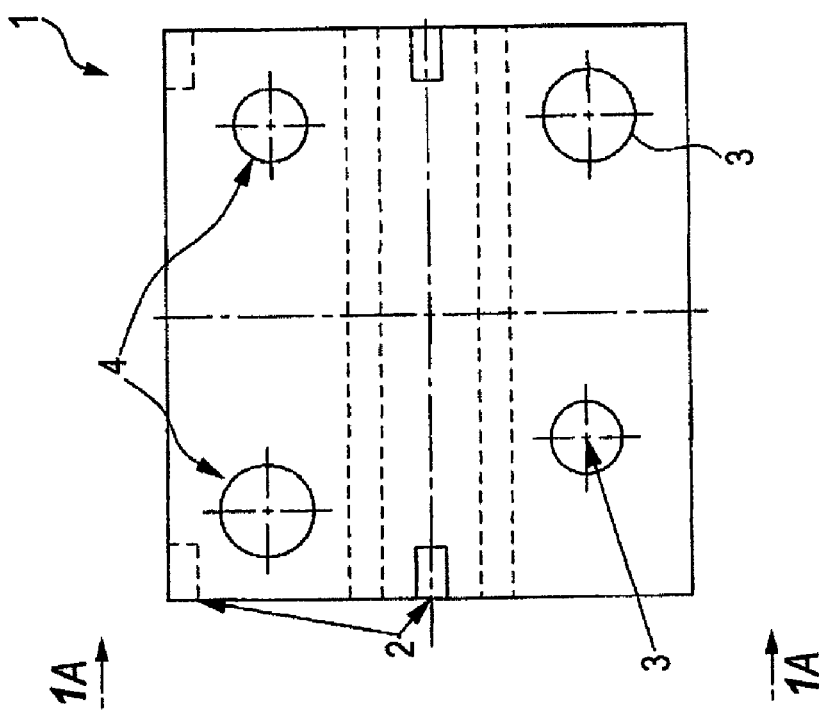
FIGS. 1A and 1B are a front view and a side view of an example of a cylinder of a small-sized extruder according to the present invention, respectively.
Figure 1A:
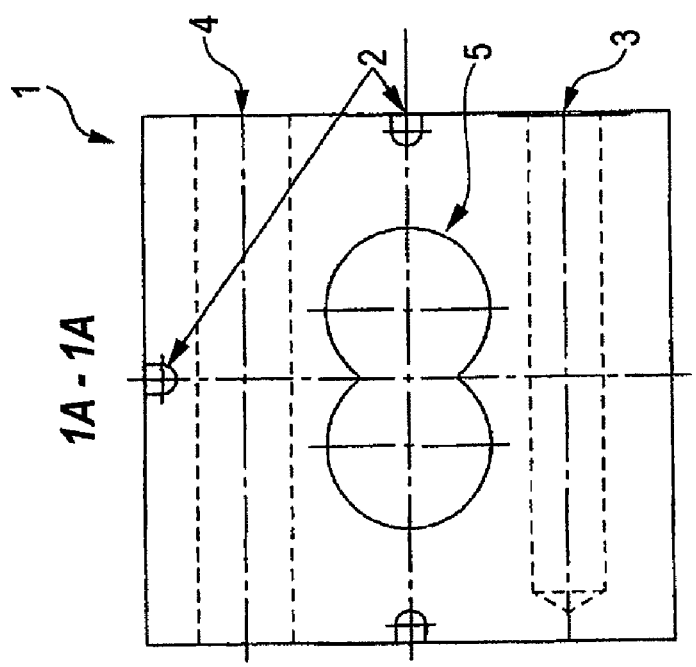
Figure 2:
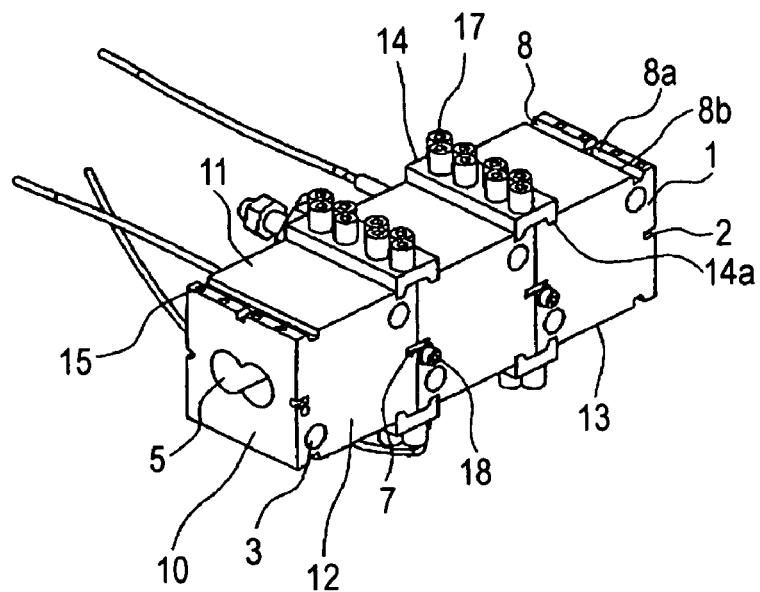
FIG. 2 is a perspective view showing a state where three intermediate cylinders are connected.

FIGS. 1A and 1B are a front view and a side view showing a cylinder used in a small-sized extruder according to the present embodiment, respectively. FIGS. 2 to 7 are exploded perspective views showing a method of disassembling the cylinder according to the present embodiment. FIG. 2 shows a state where three cylinders are connected.

The cylinder 1 has a substantially cubic shape and has a screw receiving portion 5 having a cross-sectional shape in which two circular arcs are communicate with each other penetrates through a connection surface 10. Key grooves 2 are formed in the both sides and the upper side of the screw receiving portion 5. The key grooves 2 are formed in six places per cylinder 1. The key grooves 2 are formed in the both side surfaces 12 and the upper surface 11 such that the cross sections of the grooves are visible in the connection surface 10. Since the cylinders 1 are positioned by inserting keys 7 into the key grooves 2, the positions of the key grooves 2 are the same in every cylinder. The key grooves 2 form a groove into which the key 7 is inserted, by bringing the connection surface 10 of one cylinder 1 into contact with the connection surface of the other cylinder 1. A retaining bolt 18 prevents the key 7 inserted into the key groove 2 from being pulled out, and the key 7 is inserted into the key groove 2 at the head portion of the retaining bolt 18. Incidentally, the retaining bolt 18 may include a flange provided in the head or may be combined with a washer.

Two recesses 8 are formed in the upper surface 11 and two additional recesses 8 are formed in the lower surface 13. The total of four recesses 8 are formed such that they are parallel with each other and in the vicinity of one of the connection surfaces 10. A surface of the recess 8, which is close to the connection surface 10, includes a taper surface 8a which is sloped with respect to the connection surface 10, and a parallel surface 8b parallel to the connection surface 10. The taper surface 8a is formed to be opened from the bottom of the recess 8 to an opened side. The recesses 8 having such a shape are used as a pair by bringing the connection surface 10 of one cylinder 1 into contact with the connection surface of the other cylinder 1. That is, when two wedge portions 14a of the below-described connection member 14 are inserted into the pair of recesses 8, the wedge portions 14a presses the taper surface 8a. Accordingly, the one cylinder 1 and the other cylinder 1 are tightly attached to each other. In this way, the one cylinder 1 and the other cylinder 1 are connected.

Four pin holes 15 are formed in an area from the taper surface 8a of the recess 8 to the connection surface 10. The pin holes 15 is for inserting pins thereinto. In the present embodiment, sixteen pin holes 15 are formed in one cylinder 1 and total sixteen pins 16 are inserted into the pin holes 15.

The two wedge portions 14a are formed on the connection member 14. The two wedge portion 14a are formed on the same surface of the connection member 14 in parallel. The distance between the wedge portions 14a is equal to the distance between the recesses 8 when the connection surfaces 10 of the one cylinder 1 and the other cylinder 1 are in contact with each other. The wedge portion 14a has a surface corresponding to the taper surface 8a of the recess 8 and a surface corresponding to the parallel surface 8b so as to obtain wedge effect in which the wedge portions 14a are inserted into the recesses 8.

Through-holes 14b through which the pins 16 inserted into the pin holes 15 penetrate are formed between the two wedge portions 14a of the connection member 14. When the wedge portions 14a of the connection member 14 are desired to be inserted into the recesses 8, the pins 16 penetrates through the through holes 14b of the connection member 14. The wedge portions 14a are pressed into the recesses 8 by fitting holding members 17 to the penetrated pins 16. The cylinders 1 are fixed to each other by the wedge effect. That is, the holding members 17 serve to press the wedge portions 14a into the recesses 8 and to prevent the pressed wedge portions 14a from be pulled out of the recesses 8. Instead of the pins 16, an entirely threaded bolt may be erected and tightly fastened by a round nut as the holding member 17. Alternatively, instead of the pins 16, threaded holes may be formed in outer wall surfaces 11 and 13, and the hexagon headed bolts may be inserted into the through-holes 14b of the connection member 14 and tightly fitted into the threaded holes.

[Cylinder Exchanging Method]

Next, a cylinder exchanging method according to the present embodiment will be described with reference to FIGS. 2 to 7. Here, three cylinders 1 are suffixed with A, B and C from that disposed at the front side. The following description relates to the exchange of the cylinder 1B disposed in the center.

FIG. 2 is a perspective view showing a state where the cylinders 1A, 1B and 1C are connected. The cylinder 1A and 1E are positioned by the key 7 inserted into the key groove 2 and connected to each other by the wedge effect of the connection member 14 inserted into the recesses 8. Similarly, the cylinders 1B and 1C are connected to each other.

Figure 3:
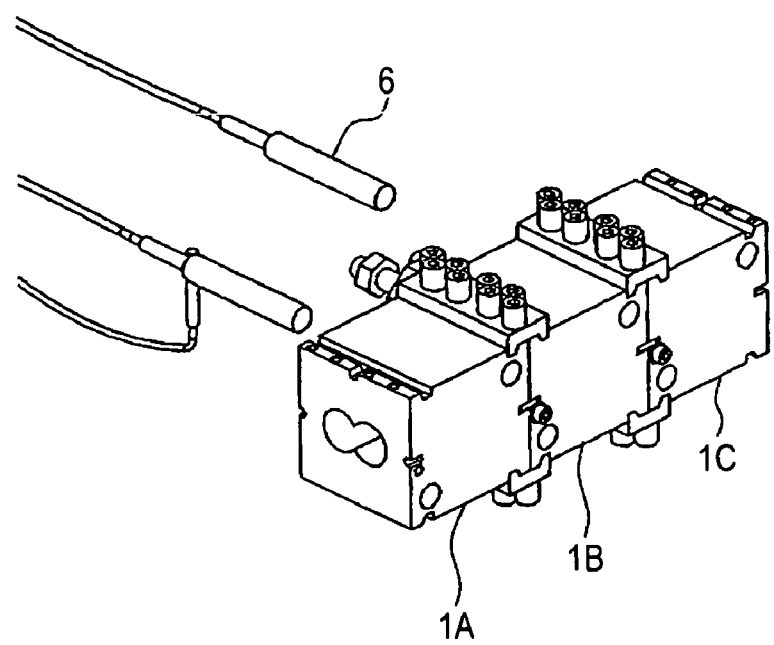
FIG. 3 is a perspective view showing detachment of heaters.

First, as shown in FIG. 3, heaters 6 are pulled out of the cylinders 1A and 1B.

Figure 4:
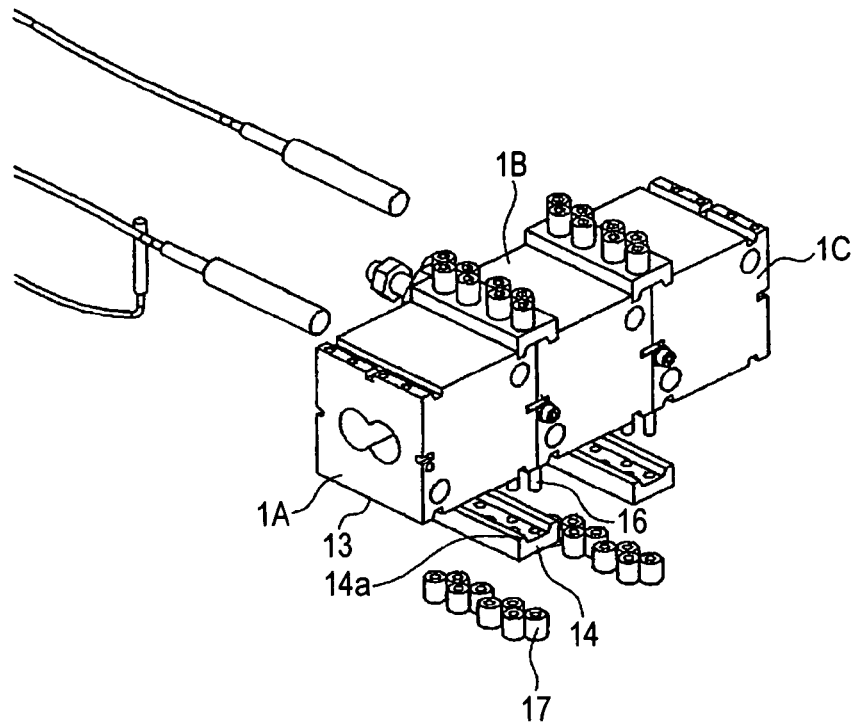
FIG. 4 is a perspective view showing a state where a connection member of a lower surface is detached.
Figure 5:
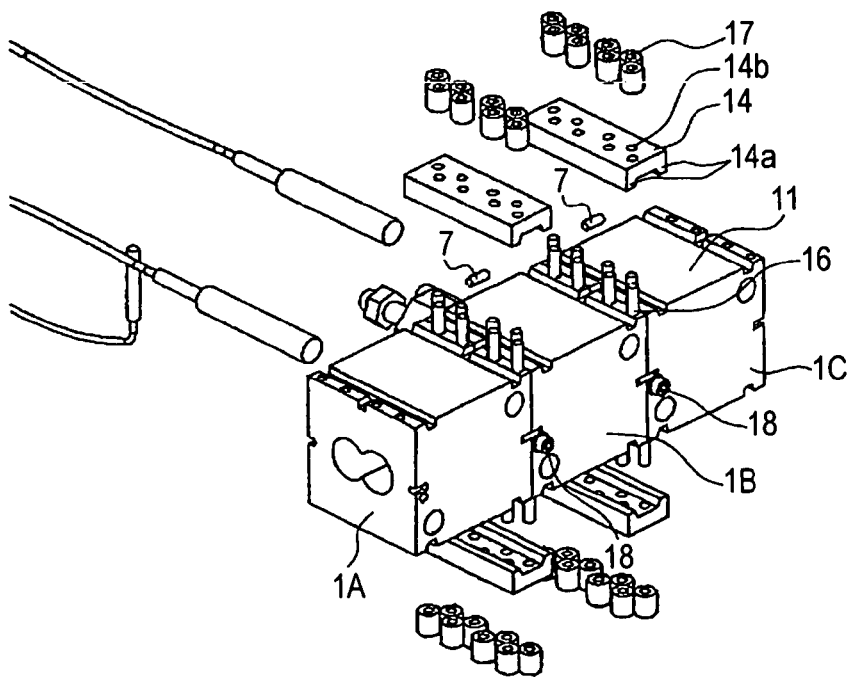
FIG. 5 is a perspective view showing a state a connection member of an upper surface is detached.
Figure 6:
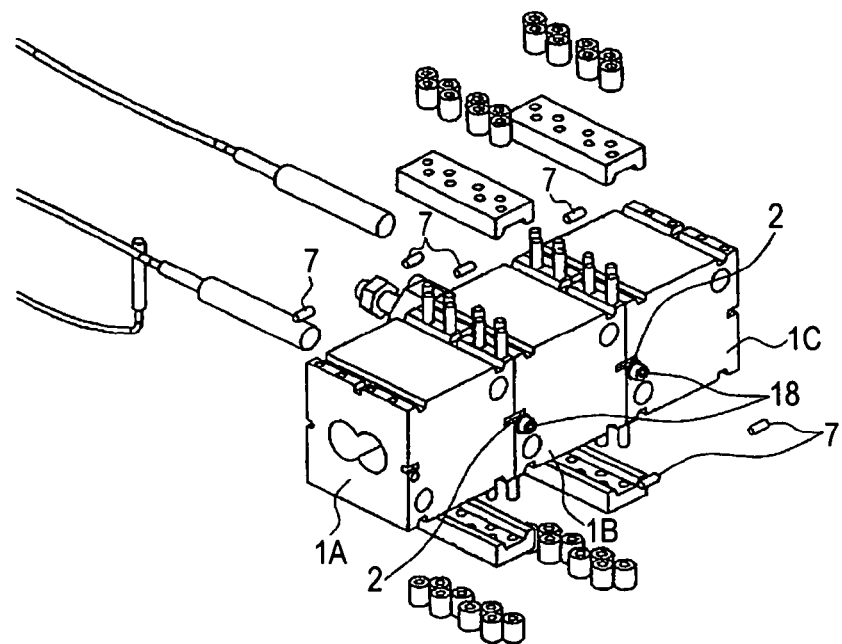
FIG. 6 is a perspective view showing a state where a key is pulled out.
Figure 7:
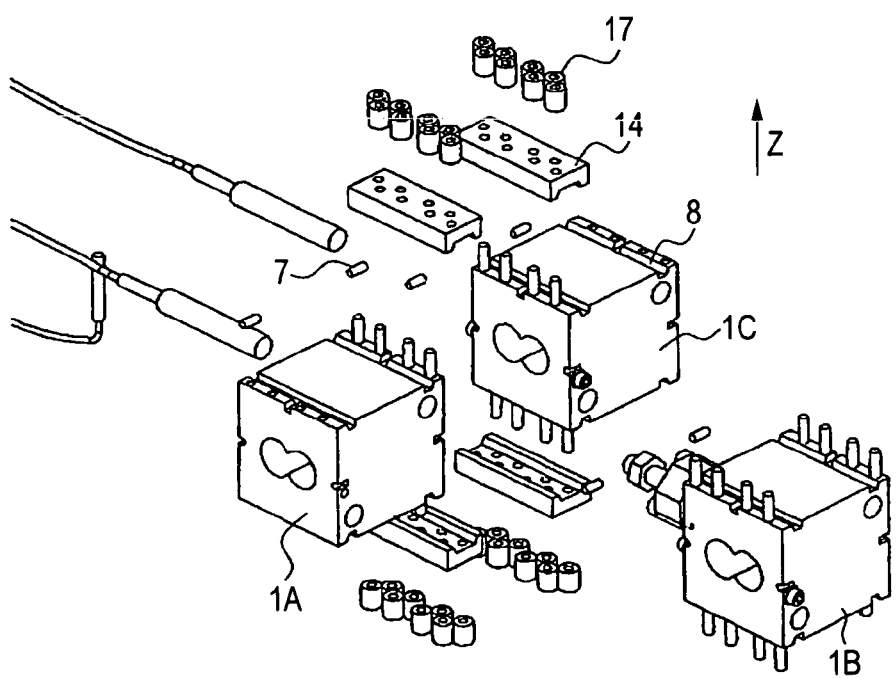
FIG. 7 is a perspective view showing a state where a cylinder provided in the center is extracted.
Figure 8A:
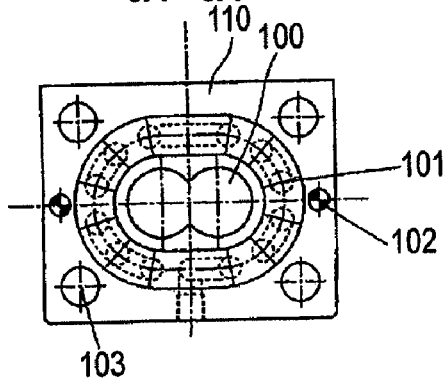
FIGS. 8A and 8B are a front view and a cross-sectional side view of a prior art intermediate cylinder of a small-sized twin-screw extruder, respectively.
Figure 8B:
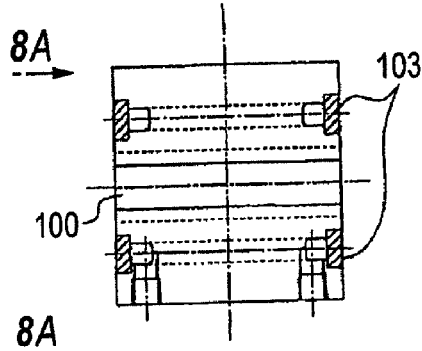
Figure 9A:
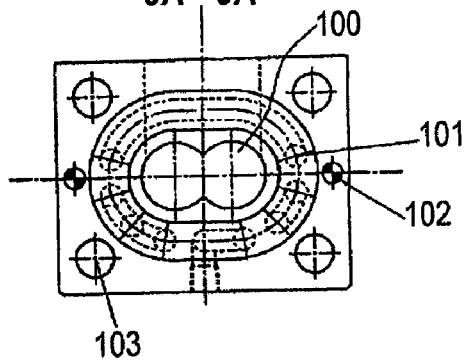
FIGS. 9A and 9B are a front view and a cross-sectional side view of a prior art vent cylinder of a small-sized twin-screw extruder, respectively.
Figure 9B:
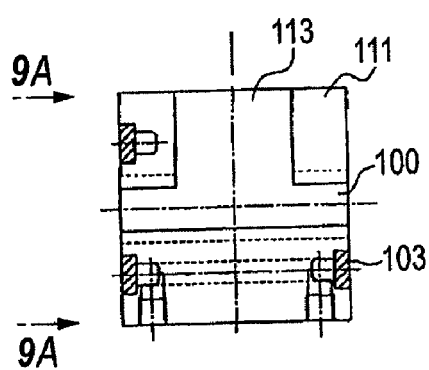
Figure 10A:
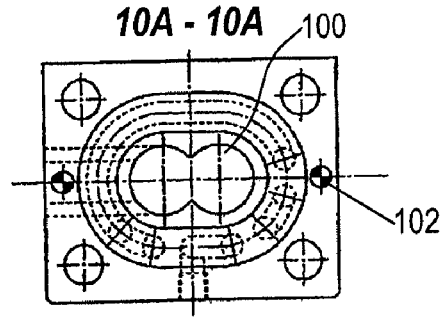
FIGS. 10A and 10B are a front view and a cross-sectional side view of a prior art side feed cylinder of a small-sized twin-screw extruder, respectively.
Figure 10B:
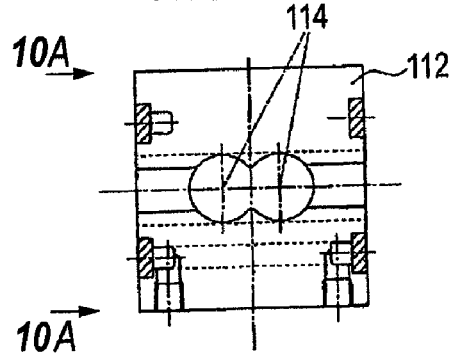
Figure 11A:
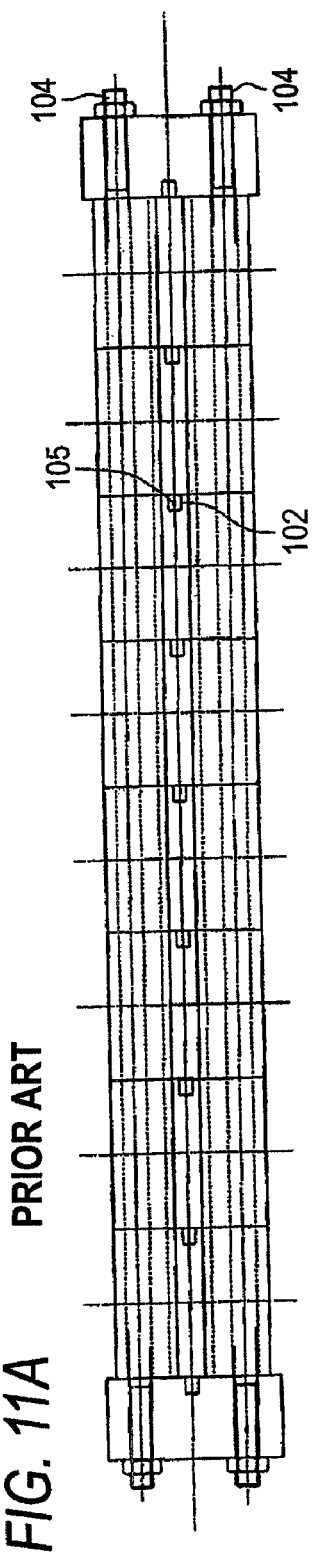
FIGS. 11A and 11B are views showing cylinder movement necessary for exchanging a prior art cylinder in a small-sized twin-screw extruder.
Figure 11B:
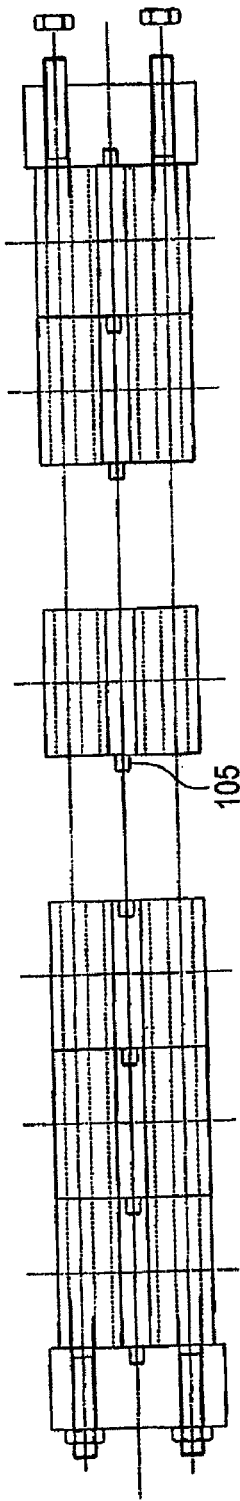
Figure 11D:
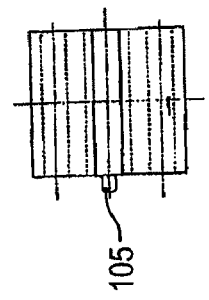
FIGS. 11C and 11D are a front view and a cross-sectional side view of the prior art cylinder shown in FIGS. 11A and 11B, respectively.
Figure 11C:
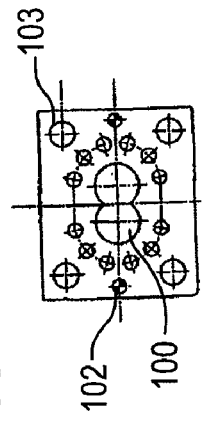

Next, as shown in FIG. 4, the holding members 17 located on the lower surface 13 side are pulled out of the pins 16 and the connection member 14 for connecting the cylinders 1A and 1B are detached. As shown in FIG. 5, the connection members 14 located on the upper surface 11 are detached. Thus, the mechanical connection of the cylinders 1A, 1B and 1C are released. Next, the retaining bolts 18 are unfastened and the keys 7 for positioning the cylinder 1A, 1B and 1C are pulled out of the key grooves 2 (FIGS. 5 and 6).

As described above, as shown in FIG. 7, the connection members 14 and the keys 7 are pulled out, then the cylinder 1B is extracted. When the cylinder 1B is extracted, the cylinders 1A and 1C need not move. That is, only the cylinder 1B can be extracted between the cylinders 1A and 1C. Although the cylinder 1B is horizontally extracted in FIG. 7, this is only for the description purpose. Actually, the cylinder 1B is extracted to the upper side (Z direction denoted by an arrow).

In the present embodiment, the recesses 8 are formed in the upper surface 11 and the lower surface 13 of the cylinder, and the key grooves 2 are formed in the upper surface 11 and the side surfaces 12. However, the present invention is not limited thereto. The recesses 8 and the key grooves 2 may be formed in any of the upper surface 11, the side surfaces 12 and the lower surface 13, which are the outer wall surfaces, except the connection surface 10.

What is claimed is:

1. An extruder comprising:
a first cylinder, through which a screw receiving portion penetrates from a first connection surface of the first cylinder to a second connection surface of the first cylinder, the first connection surface of the first cylinder being connected to a third connection surface of a second cylinder;
wherein at least one outer wall surface of the first cylinder, excluding the first connection surface and the second connection surface, comprises:
a key groove for positioning the second cylinder to the first cylinder; and
a recess having a tapered surface; and
wherein the extruder further comprises a connection member including a wedge portion which is pressed into the recess to connect the first cylinder with the second cylinder.

2. The extruder according to claim 1,
wherein the connection member further comprises:
two wedge portions formed in one surface of the connection member; and
a through-hole through which a pin or an entirely threaded bolt being erected on the at least one outer wall surface of the first cylinder penetrates.

3. The extruder according to claim 1,
wherein a threaded hole is formed in the at least one outer wall surface of the first cylinder, and
wherein the connection member further comprises:
two wedge portions formed in one surface of the connection member; and
a through-hole through which a bolt penetrates;
wherein the bolt fastens to the threaded hole formed in the at least one outer wall surface of the first cylinder.

4. A method of exchanging a cylinder of an extruder, comprising:

providing the extruder with a first cylinder, through which a screw receiving hole extends from a first connection surface of the first cylinder to a second connection surface of the first cylinder;
providing the extruder with a second cylinder, through which a screw receiving hole extends from a third connection surface of the second cylinder to a fourth connection surface of the second cylinder;
wherein the first connection surface of the cylinder is connected to the third connection surface of the second cylinder;
wherein at least one outer wall surface of each of the cylinders, excluding the connection surfaces, comprises:
a key groove for positioning the second cylinder with respect to the first cylinder; and
a recess having a tapered surface;
the method further comprising:
inserting a key into the key groove; and
inserting and extracting two wedge portions of a connection member into and from the recesses of the cylinders, the two wedge portions being formed in one surface of the connection member.

5. An extruder comprising:
a first housing section;
a second housing section;
wherein each housing section comprises:
a front surface;
a back surface opposite the front surface;
a screw receiving hole that extends through the housing section from the front surface to the back surface; and
an outer surface, excluding the front surface and the back surface, comprising a recess;
wherein when the screw receiving hole of the first housing section is axially aligned with the screw receiving hole of the second housing section, the back surface of the first housing section faces the front surface of the second housing section;
wherein the extruder further comprises a connection member for engaging the recess of the first housing section and the recess of the second housing section to connect the first housing section to the second housing section.

6. The extruder according to claim 5, wherein the recess of each housing section comprises a tapered surface.

7. The extruder according to claim 6, wherein when the connection member is simultaneously pressed against the tapered surface of the first housing section and the tapered surface of the second housing section, the first housing section and the second housing section are forced towards each other, thereby connecting the two housing sections.

8. The extruder according to claim 7, wherein the connection member comprises:
a first angled surface that corresponds with the tapered surface of the first housing section; and
a second angled surface that corresponds with the tapered surface of the second housing section.

9. The extruder according to claim 5, wherein the outer surface of the first housing section further comprises at least one key groove formed at an edge of the back surface;
wherein the outer surface of the second housing section further comprises at least one key groove formed at an edge of the front surface;
wherein when a key is inserted in the key grooves, the first housing section and the second housing section are positioned with respect to each other.

10. The extruder according to claim 5, wherein the front surface and the back surface of each housing section is flat without any protrusions, such that when the housing sections are not connected by the connection member, the housing sections are slidable with respect to each other.

11. The extruder according to claim 5, wherein each housing section further comprises a second outer surface opposite the outer surface, the second outer surface comprising a second recess;
   wherein the extruder further comprises a second connection member for engaging the second recess of the first housing section and the second recess of the second housing section to connect the first housing section to the second housing section.

12. The extruder according to claim 5, wherein the recess of each housing section is an elongated groove.

13. The extruder according to claim 5, wherein the connection member further comprises a through-hole;
   wherein either the first housing section or the second housing section further comprises a threaded hole;
   wherein a bolt is inserted through the through-hole and fastened to the threaded hole, such that the connection member is pressed against the first housing section and the second housing section.

14. The extruder according to claim 5, wherein the connection member further comprises a through-hole;
   wherein either the first housing section or the second housing section comprises a threaded pin extending from the outer surface;
   wherein the threaded pin is inserted through the through-hole and a nut is fastened to the threaded pin such that the connection member is pressed against the first housing section and the second housing section.

* * * * *